United States Patent [19]
Difford

[11] 3,943,226
[45] Mar. 9, 1976

[54] FLUIDS PURIFICATION
[75] Inventor: Anthony Miles Robert Difford, Stockton-On-Tees, England
[73] Assignee: Imperial Chemical Industries Limited, London, England
[22] Filed: Feb. 12, 1974
[21] Appl. No.: 441,818

[30] Foreign Application Priority Data
Feb. 27, 1973 United Kingdom.................. 9474/73

[52] U.S. Cl. .................. 423/230; 423/240; 423/241
[51] Int. Cl.$^2$..................... B01D 15/00; B01D 57/00
[58] Field of Search ........ 423/230, 240, 241; 55/71, 55/75

[56] References Cited
UNITED STATES PATENTS
2,037,790  1/1933  Ipatieff........................... 423/230 X FOREIGN PATENTS OR APPLICATIONS
4,528,289  11/1965  Japan.................................. 423/240
4,639,081  5/1971  Japan.................................. 423/230
1,145,032  3/1969  United Kingdom................. 423/230

Primary Examiner—L. Dewayne Rutledge
Assistant Examiner—Arthur J. Steiner
Attorney, Agent, or Firm—Cushman, Darby & Cushman

[57] ABSTRACT

A process fluid is purified of strongly acidic impurities, preparatory to treatment over a catalyst or over a hydrogen sulphide absorbing material, by contact with one or more alkali metal aluminates, preferably a beta alumi aluminate. Such aluminates have a high capacity for absorbing hydrogen halides. The process fluid is especially a naphtha hydrocarbon to be reacted with steam to give a gas of high methane content.

9 Claims, No Drawings

FLUIDS PURIFICATION

The present invention relates to a process of fluids purification and in particular for removing small quantities of acidic impurities from gases preliminary to treatment over a catalyst and/or over a hydrogen sulphide absorbing material.

The need has recently been recognised to treat fluids such as process feedstocks, product gases and waste gases with strongly basic substances, in order to remove acidic impurities and compounds readily convertible thereto such as hydrogen halides, oxides or oxyacids of nitrogen and sulphur and volatile halogen compounds. Although many such substances are of some value, the hydroxides and carbonates of alkali metals are preferred because they are more strongly basic. It is, however, not easy to make highly effective fixed beds of absorbent particles containing alkali metal compounds; the simple method of impregnating a catalyst support such as alumina with an alkali metal compound gives an absorbent of relatively low capacity, such that a bed of such an absorbent would have to be too large or would have to be replaced too often.

We have now found that alkali metal aluminates are highly effective as absorbents for acidic impurities, especially hydrogen halides, when it is required to avoid deactivation of a catalyst or of a hydrogen sulphide absorbing material.

According to the invention there is provided a process for treating a process fluid over a solid catalytic material and/or over a solid hydrogen sulphide absorbing material, characterised by contacting the fluid with one or more alkali metal aluminates disposed so as to diminish or prevent access of strongly acidic impurities in the fluid to the catalytic or absorbing material.

Among the alkali metal aluminates that can be used are sodium beta alumina $Na_2O.11Al_2O_3$, potassium beta alumina $K_2O.11Al_2O_3$, aluminate containing 5 molecules of $Al_2O_3$ per molecule of alkali metal oxide, and aluminates of general formula $MAlO_2$ (M being an alkali metal). Aluminates of formula $MAlO_2$ are preferred, especially when in beta form, the form stable at temperatures below about 500° C. Preferably the alkali metal is present to the extent of 0.9 to 1.5 times the aluminium, by metal atoms, in the active portion of the absorbent. A description of the alumina compounds of sodium is to be found in the article by Théry and Briançon in Revue des Hautes Températures et des Réfractaires, 1964,1, 221–227.

The aluminate is conveniently used in particulate form. By "particulate" it is meant that it is in discrete pieces large enough to be used in a settlable bed such as a fluidised, liftable or fixed contact bed. The particles are thus typically in the size range 10 microns to 5 centimetres, most conveniently 1 to 20 millimetres. They can be of regular or irregular shape. Very suitably they are approximately spherical (such as may be made by spray-drying, wet-granulation, dropping into oil, prilling or tumbling) or cylindrical or ring-shaped (such as may be made by extrusion or compression) or in the form of multi-tubular matrices or fragments thereof.

Preferred specific surfaces and pore volumes for the aluminate absorbent, especially when alumina-supported, are given below in relation to the methods of making it. These are believed to define new compositions of matter.

The discrete pieces can consist of aluminate of one or more of the types mentioned or of other types or aluminate may be present in conjunction with other materials such as catalyst support materials such as alumina, silica, magnesia, titania, zirconia, hafnia, thoria or chormia and compounds of such materials with one another or with other refractory oxides such as alkaline earth oxides (for example hydraulic cements such as calcium aluminates) or rare earth oxides. Such materials can be mixed with the alkali metal aluminate or can be present as pre-formed shapes carrying the aluminate in pores or as a surface layer. When such materials are more basic than zinc oxide, for example are alkaline compounds of alkaline earth metals or rare earth metals, they contribute to the acid-absorbing capacity.

The contacting is carried out suitably at a temperature of up to 500° C. It can be carried out at room temperature, with due precautions if liquid water or other polar liquids are likely to be present, but is more useful at temperatures of 200°–450° C, such as are found in hydrocarbon or steam/hydrocarbon feeds to catalytic steam reforming processes and thermal cracking processes, and in gas streams entering catalytic processes of carbon monoxide shift, methanation, ammonia synthesis and reactions between carbon oxides and hydrogen such as Fishcer-Tropsch synthesis and methanol synthesis. The invention is applied preferably to substantially steam-free, water-free fluids.

The contacting can be at any convenient pressure; normally the pressure range is 1–500 ata.

The space velocity of the contacting when applied to gases is conveniently in the range $10^2$ to $10^5$ hour$^{-1}$. Since the reaction of strongly acidic impurities with alkali metal aluminates is very rapid and can be very complete, the choice of space velocity (that is, the inverse of the quantity of catalyst) can be made freely within this range according to the period to be allowed between replacements of the absorbent.

Among the catalytic processes that can with advantage be operated according to the invention are the reaction of a hydrocarbon of greater molecular weight than methane, especially a liquefied petroleum gas or a naphtha boiling at up to 350°C, especially up to 220° C, with steam to give hydrogen and carbon dioxide (high space velocity, low conversion) at temperatures in the range 200°–650° C, especially 350°–550° C, or to give methane (at lower space velocity and high conversion) at the same temperatures. Other catalytic processes, less important as applications of the invention, include high temperature steam/hydrocarbon reactions without or with partial combustion; low temperature carbon monoxide shift over a copper-containing catalyst, especially one containing also the oxide of zinc or manganese or chromium or more than one such oxide; the reaction of carbon oxides with hydrogen to give methane, either in a hydrogen-rich stream to remove such oxides or in a methane-containing stream to be converted to a natural gas substitute. The absorption step is also very usefully applied to various gas streams subject to halogen impurities, for example hydrogen-containing streams purged from rom processes such as cataytic synthesis, dehydrogenation, acetylene manufacture and petroleum refinery operations such as platforming, or natural gas or nitrogen streams used as diluents for other gases. Such gas streams derived from platforming are especially liable to contain halogen impurities as a result of desorption of halogen compounds from platforming catalysts. Among processes using such gas streams are catalyst start-up reductions and organic hydrogenations of various types.

In the above-mentioned steam/hydrocarbon reaction to give methane the pressure is suitably in the range 10–100 ata. The active metal of the catalyst is usually one or more metals from Group VIII of the Periodic Table (as given in "Abridgements of Specifications" as published by the UK Patent Office) and is preferably nickel or ruthenium. The support of the catalyst is preferably alumina. The catalyst is preferably one that has been made by co-precipitation of compounds of nickel and alumina. The proportion of nickel in the catalyst, calculated as nickel oxide NiO on the oxide composition from which the catalyst is made by reduction, is suitably in the range 25–90, especially 40–75%, by weight. The catalyst may contain a small proportion of a compound of an alkali metal or an alkaline earth metal or both for example 0.05 to 3.5% by weight of an alkali metal compound calculated as equivalent $K_2O$ or 0.1 to 10% of an alkaline earth metal compound calculated as equivalent MgO. The steam/hydrocarbon reaction may be effected in the gaseous or the liquid phase and may, if desired, be in the presence of methane, carbon oxides and hydrogen suitably derived from a separate steam/hydrocarbon reaction or possibly provided by recycle of product gas.

Such steam/hydrocarbon reactions may be conducted so as to produce a gas containing sufficient methane to be usable (after carbon dioxide removal) as a natural gas substitute, or may be followed by one or more methanation stages. Suitable over-all processes are described in our co-pending UK application Nos. 3684/72 and 3685/72.

In the process of the invention the aluminate preferably is disposed just upstream of the catalyst or absorbing material that is to be protected. It may be in a separate bed or may be on the bed of catalyst or may be mixed with the catalyst. In order to protect a low temperature shift catalyst in a system in which it is preceded directly, apart from a cooling step, by a high temperature shift catalyst, the aluminate may be just upstream of the high temperature shift catalyst or mixed therewith.

The process of the invention may be carried out following a hydrogenation step in which halogeno hydrocarbons are converted to hydrogen halides and hydrocarbons. Such a step may be effected at the same time as other hydrogenative purifications such as removal of sulphur, nitrogen or oxygen from hydrocarbon derivatives. In an important form of the invention a hydrocarbon feedstock such as a natural gas or liquefied petroleum gas or vaporisable hydrocarbon boiling at up to 350° C is passed with hydrogen over a hydrodesulphurisation catalyst such as a platinum group metal or a combination of an oxide and/or sulphide of one or more of iron, cobalt or nickel with one or more oxides and/or sulphides of chromium, molybdenum and tungsten, then over (in either order or mixed together) an alkali metal aluminate and a hydrogen sulphide absorbing material such as iron oxide, manganese oxide or zinc oxide. This is a development of the "desulphurisation sandwich" system, a form of which, using a pre-bed of hydrogen sulphide absorbing material, is described in our UK specification No. 902148. By the use of the aluminate it is possible to avoid any shortening of the life of the hydrogen sulphide absorbing material that might result from the action of hydrogen halide. Such a system can have a preliminary treatment, for example with sulphuric acid, followed by water-washing and neutralisation, and/or with hydrogen and an absorbing material, to remove the bulk of the sulphur and halogen. If the hydrodesulphurisation activity of the hydrodesulphurisation catalyst is impared by hydrogen halide, a further bed of such catalyst may be used downstream of the aluminate.

The absorbent according to the invention can also be used following steam-desulphurisation of a hydrocarbon over a catalyst such as uranium oxide.

In a process sequence using several catalytic stages acidic gas absorption stages according to the invention can be used in conjunction with more than one such stage.

The invention provides methods of making the alkali aluminates. In one such method an alkali metal compound capable of reacting with alumina, such as an oxide, peroxide, hydroxide, carbonate, nitrate, nitrite or salt of carboxylic acid is heated with solid alumina until the required aluminate is produced. Conveniently the alumina is formed into the required shapes before applying the alkali compound to it, but shaping can be after the reaction if desired. In a second method a solution of an alkali metal aluminate or a melt thereof or a mixture of aluminate-forming compounds, is applied to a support material; conveniently the support material is alumina but it can be a different support material such as silica, magnesia, titania, zirconia, hafnia, thoria or chromia or compounds of such materials with one another or with alumina or with other refractory oxides such as alkaline earth oxides or ceria or rare earth oxides. Again the support material can be shaped before or after the application of the aluminate or aluminate-forming compounds.

When alumina is to be converted to alkali metal aluminate it is preferably initially in a form having a specific surface greater than 100 $m^2/g$, for example 200–250 $m^2/g$. Conversion to aluminate produces material having a specific surface of preferably 5–90, especially 10–40 $m^2/g$. This starting alumina preferably has a high pore volume, for example over 0.3 and especially over 0.5 cc/g. The aluminate formed from such an alumina has a pore volume also over 0.3, for example in the range 0.3 to 0.6 cc/g, and these ranges are preferred for the process of the invention.

In order to ensure formation of the preferred beta aluminate the temperature of any thermal treatments in preparing the absorbent should be kept below about 500° C. The time of such treatments should be long enough to effect sufficient conversion and may be for example in the range 20–100 hours.

The aluminate absorbent can, if desired, be made by other methods, for example thermal decomposition of alkali metal alumino-carbonates.

EXAMPLE 1

Preparation of absorbent a. A 100g sample of poorly crystalline gamma alumina in approximately spherical granules of diameter 4–5 mm, surface area 277 $m^2/g$ and pore volume 0.61 cc/g, was soaked for 20 minutes in a solution of sodium hydroxide (100 g NaOH made up to 300 ml with water). The soaked granules were allowed to drain for 30 minutes and then dried and calcined for 64 hours at 450° C. They contained 47% by weight of gamma alumina, 53% of beta sodium aluminate but no gamma sodium aluminate or beta alumina.

b. By way of comparison a sample (2 kg) of crystalline gamma alumina in cylindrical pellets of height and diameter 5.4 mm, surface area 77 m²/g and pore volume 0.29 cc/g, were soaked in a sodium hydroxide solution (1.25 kg NaOH made up to 3.8 litres with water), drained for 20 minutes and dried. A portion was calcined at 600°C for 16 hours. This product contained 79% by weight of gamma alumina, 21% of gamma sodium aluminate, but no beta sodium aluminate or beta alumina.

c. By way of a further comparison a portion of dried drained pellets from (a) were calcined at 1000°C for 3 hours. The resulting product contained 89% by weight of sodium beta alumina $NaAl_{11}O_{17}$ and 11% of gamma sodium aluminate but no gamma alumina or beta sodium aluminate. (The proportions of the various phases were determined by X-ray diffraction using Cu K$\alpha$ radiation)

Tests of absorption capacity

Each absorbent was tested by passing over it a mixture of vaporised desulphurised naphtha (boiling range 30°–170°C) (2.5% by volume) and nitrogen (97.5% by volume) containing 100 ppm $w/w$ of chlorine added as HCl, at 350°C, 1 ata pressure and total volume space velocity 2500 hour$^{-1}$. The outlet mixture was analysed for chlorine; when the chlorine content, which was initially zero, rose to 1 ppm $w/w$ the run was stopped and the absorbent analysed for chlorine. The table shows the absorption capacity expressed as a weight percentage of chlorine in the absorbent.

TABLE

| Initial properties | Absorbent | | |
|---|---|---|---|
| | (a) | (b) | (c) |
| % Composition: | | | |
| gamma alumina | 47 | 79 | 0 |
| $NaAl_{11}O_{17}$ | 0 | 0 | 89 |
| gamma sodium aluminate | 0 | 21 | 11 |
| beta sodium aluminate | 53 | 0 | 0 |
| Surface area m²/g | 23 | 47 | 17 |
| Pore volume cc/g | 0.42 | 0.27 | 0.24 |
| Absorption capacity % Cl $w/w$ | 11.3 | 1.2 | 0.5 |

It appears that sodium beta alumina $NaAl_{11}O_{17}$ is not a very good absorbent for chlorine, gamma sodium aluminate is significantly better, but that beta sodium aluminate is much more effective. The high absorbency of sample (a) is evidently not due to high surface area but may be correlated with pore volume.

EXAMPLE 2

Purification of naphtha

An upward-flow laboratory reactor was charged with 800 ml of extruded cylinders 0.125 inch in diameter and 0.25 to 0.5 inch in length of a hydrodesulphurisation catalyst consisting of sulphided nickel oxide and molybdenum oxide on alumina and then, over and in contact with that catalyst, 100 ml (i.e. 86 g) of sodium beta aluminate/alumina granules from a works-scale repeat of the preparation described in Example 1(a). The reactor was fed with a mixture at 300°C of hydrogen (84 litres per hour), vaporised desulphurised halide-free naphtha (980 ml per hour before vaporisation) and doped naphtha (20 ml per hour before vaporisation and containing 0.55% by volume of 1-chloro2-methyl propane and 1.16% by volume of thiophenol). These quantities correspond to 53 ppm of chlorine and 100 ppm of sulphur, both by weight. The boiling range of the naphtha was 30°–170°C. The reactor was heated electrically to maintain an internal temperature rising to 400°C at the outlet. The effluent from the reactor was cooled and the resulting liquid phase and gaseous phase were analysed at intervals for sulphur and chloride. Passage of the mixture was continued until chloride could be detected in the gaseous phase. In this test, which is an accelerated test, detection of chloride was possible after about 160 hours' operation.

The concentrations of chloride measured in the product gas and naphtha are shown in Table 2. Since only a small proportion of chloride appears in the products it is evident that substantially all of it has been absorbed by the sodium beta aluminate.

TABLE 2

| chloride fed g | chloride in product gas, ppm $v/v$ | chloride in product naphtha | |
|---|---|---|---|
| | | ppm $w/w$ | % of feed |
| 0.45 | 0.0 | 0.64 | 1.2 |
| 1.12 | 0.0 | 1.4 | 2.7 |
| 3.25 | 0.0 | 1.4 | 2.7 |
| 4.45 | 0.0 | 1.5 | 2.8 |
| 5.05 | 0.9 | 1.5 | 2.8 |
| 5.95 | 1.8 | 1.4 | 2.7 |
| 6.75 | 6.0 | Not measured | |

The absorption capacity of the sodium beta aluminate is about 5.8% by weight. This is less than was recorded under the conditions used in Example 1 but is fully adequate for industrial purification of liquid hydrocarbon feedstocks.

The concentration of sulphur in the product gas was initially low but rose to 90–100% of the rate of feed by the time about 3% $w/w$ of chloride had been taken up by the sodium beta aluminate. The sulphur content of the product naphtha stayed constant at 0.6 to 0.8 ppm $w/w$, showing that the hydrodesulphurisation activity of the nickel molybdenum catalyst used had not been impaired by chloride.

In industrial practice the sulphur in the product gas, which is in the form of hydrogen sulphide would be absorbed in a bed of, for example, iron oxide, manganese oxide or zinc oxide. The naphtha would not be condensed but would also be passed over the hydrogen sulphide absorbing bed and thence could be mixed with steam and, with further heating if necessary passed over a supported nickel catalyst at an outlet temperature of 350°–550°C and a pressure of 10–25 ata to produce a gas containing for example 60% $v/v$ of methane after allowing for unreacted steam. As an alternative the naphtha could be fed to the product gas of such a naphtha steam reaction and the mixture passed over a supported nickel catalyst to give a gas of still higher methane content.

I claim:

1. In a process for treating a gaseous process fluid over a solid catalytic material, solid hydrogen sulphide absorbing material, or both, the improvement which comprises contacting said gaseous process fluid at a temperature up to 500°C with discrete pieces of one or more alkali metal aluminates in the beta form, prior or simultaneous to treatment with said catalytic or absorbing material whereby the access of strongly acidic impurities in the fluid to said catalytic or absorbing material is diminished or prevented.

2. A process according to claim 1 in which an aluminate of formula $MAlO_a$, where M is an alkali metal, is used.

3. A process according to claim 1 in which the aluminate is supported on alumina.

4. A process according to claim 3 in which the specific surface of the alumina-supported aluminate is in the range 5–90 $m^2/g$.

5. A process according to claim 3 in which the pore volume of the alumina-supported aluminate is over 0.3 cc/g.

6. A process according to claim 1 in which the temperature is in the range 200°–450° C.

7. A process according to claim 1 when carried out following a hydrogenation step in which halogeno hydrocarbons are converted to hydrogen halides and hydrocarbons.

8. A process according to claim 7 in which the vapour of a hydrocarbon feedstock boiling at up to 350° C is passed with hydrogen over a hydrodesulphurisation catalyst, then over an alkali metal aluminate and a hydrogen sulphide absorbing material.

9. A process according to claim 1 when succeeded by the reaction of a hydrocarbon of greater molecular weight than methane with steam over a highly active supported nickel catalyst at a temperature in the range 200°–650° C.

* * * * *